United States Patent
Haenle (12) United States Patent (10) Patent No.: US 7,296,954 B2
(45) Date of Patent: Nov. 20, 2007

(54) DRILLING TOOL FOR CUTTING CAST MATERIALS

(75) Inventor: Peter Haenle, Inzigkofen (DE)

(73) Assignee: Joerg Guehring, Albstadt (DE)

( * ) Notice: Subject to any disclaimer, the term of this patent is extended or adjusted under 35 U.S.C. 154(b) by 0 days.

(21) Appl. No.: 11/268,320

(22) Filed: Nov. 7, 2005

(65) Prior Publication Data

US 2006/0056929 A1    Mar. 16, 2006

Related U.S. Application Data (63) Continuation of application No. PCT/EP2004/004149, filed on Apr. 19, 2004.

(30) Foreign Application Priority Data

May 9, 2003   (DE) .......................... 203 07 258 U (51) Int. Cl.
B23B 51/02   (2006.01)

(52) U.S. Cl. ...................... 408/227; 408/230

(58) Field of Classification Search ........ 408/223–225, 408/227–230, 59; B23B 51/00, 51/02
See application file for complete search history.

(56) References Cited

U.S. PATENT DOCUMENTS

| 1,309,706 | A | * | 7/1919 | Taylor ........................ 408/230 |
|---|---|---|---|---|
| 3,592,555 | A | | 7/1971 | Mackey, Sr. |
| 4,116,580 | A | | 9/1978 | Hall et al. |
| 5,273,380 | A | * | 12/1993 | Musacchia .................. 408/230 |
| 6,224,302 | B1 | * | 5/2001 | Cole .......................... 408/224 |
| 6,929,434 | B2 | * | 8/2005 | Prokop ....................... 408/230 |
| 7,140,815 | B2 | * | 11/2006 | George et al. ............. 408/230 |
| 2002/0172569 | A1 | | 11/2002 | Nakamura |
| 2003/0202853 | A1 | * | 10/2003 | Ko et al. .................... 408/225 |
| 2004/0018064 | A1 | * | 1/2004 | Liu ............................ 408/224 |

FOREIGN PATENT DOCUMENTS

| DE | 29919858 U1 | * | 4/2000 |
|---|---|---|---|
| DE | 1004055198 A1 | * | 5/2006 |
| EP | 0 549 548 A1 | | 6/1993 |
| EP | 0 591 122 A1 | | 4/1994 |
| EP | 0 790 092 A1 | | 8/1997 |
| JP | 2000263306 A | * | 9/2000 |
| JP | 2002036018 A | * | 2/2002 |

OTHER PUBLICATIONS

Internet translation of JP2002-036018.*
Internet translation of JP 2000-263306.*

* cited by examiner

*Primary Examiner*—Daniel W. Howell
(74) *Attorney, Agent, or Firm*—Burr & Brown (57) ABSTRACT

A drill for hard materials, comprising webs that are subdivided by means of cutting grooves, and at least one principal cutting edge, each of which is provided with a cutting corner and a transition to a chisel edge. At least some sections of the principal cutting edge are continuously convex in an axial direction starting from the cutting edge.

25 Claims, 4 Drawing Sheets

DRILLING TOOL FOR CUTTING CAST MATERIALS

This application is a Continuation of International Application PCT/EP2004/004149, filed Apr. 19, 2004, the entirety of which is incorporated herein by reference. This application claims the benefit of German Application No. DE 203 07 258.8, filed May 9, 2003, the entirety of which is incorporated herein by reference.

The invention relates to a drilling tool for cutting cast materials, such as for example grey iron and in particular GGV or ADI.

The development of cast materials is proceeding towards higher-strength materials with higher toughness at the same time. In engine building, the classically used spheroidal graphite (GGG) is being increasingly replaced by vermicular graphite (GGV). Newer materials such as austempered ductile iron—ADI have higher strength and toughness values.

When selecting the materials for tools for cutting cast materials, attention must therefore be paid to a ratio between the opposing tool parameters, hardness and toughness, matched to the respective material.

In addition, as a result of the granular and irregular casting structure with hard phases (for example, ferrite, perlite or martensite) and soft carbon inclusions, the tools used to cut cast iron workpieces are subject to high abrasive wear. Furthermore, the inhomogeneous structure results in a high bending moment loading where vibration-free processing cannot always be provided.

In order to achieve a compromise between the opposing requirements for high hardness and resistance to wear on the one hand and high toughness and permanent vibrational loading capacity on the other hand, conventional drilling tools made of solid hard metal from class K30-K40 according to the ISO 513 classification are used for cutting GGG and GGV, which attains moderate degrees of hardness with moderate toughness values. In this case, however, the tool lives and the attainable cutting performance, i.e., the movable cutting speeds and feeds are limited.

Further developments resulted in the use of so-called microgram or ultrafine grain hard metals with grain sizes of the WC crystals <0.8 µm which in addition to high hardness, also promise a high bending strength but also cause correspondingly high material costs.

In addition to the suitable choice of material for the tool, these tools are now cooled internally to reduce friction influences and improve swarf disposal.

In this case, the cutting corner was recognised as the point of the principal cutting edge subjected not only to the highest mechanical but also thermal loading so that the specific chamfering at the cutting corner in the form of a so-called casting chamfer or "double-angle-point" geometry (acute angle, e.g. 118°, at the chamfer 90°) is used.

Additionally known in the machining of materials such as steels, for example, are HSS drills with drill tip geometries having principal cutting edge profiles which decrease over a radius in a longitudinal section through the drill, such as the so-called "Racon Point" geometry (radius-conical, i.e., the radius extends over the entire length of the principal cutting edge) or the Bickford point geometry (the radius extends only over the exterior principal cutting-edge section whereas a central section with a linear principal cutting edge profile forms a good centring tip).

The U.S. specification U.S. Pat. No. 3,443,459, for example, describes a drill with a principal cutting-edge profile in a plane lying parallel to the axis of the drill where the principal cutting edge decreases from the drill tip with a radius as far as the auxiliary cutting edge and goes over tangentially into the drill circumference so that a sharp cutting corner is completely avoided.

U.S. Pat. No. 1,309,706 on the other hand describes a drill with a principal cutting-edge profile where the principal cutting edge follows a radius in a plane spanned by the drill axis and the cutting corner in an outer section and runs linearly in a central section. In this case, the transition from auxiliary cutting edge to principal cutting edge is not tangential but at a certain angle. However, the remaining cutting corner is thus at least very much more blunt than in conventional drills with a rectilinear profile of the principal cutting edge in the upper plane.

In addition to avoiding the sharp cutting corner, especially in the exterior and therefore highly loaded areas, these embodiments of the principal cutting edge result in a lengthening of the principal cutting edge or a reduction in the cutting work to be performed per unit length of the principal cutting edge.

Starting herefrom, it is an object of the present invention to provide a drill which is optimized for the cutting of cast materials, such as for example, grey iron and especially GGV or ADI and promises low costs in addition to long useful lives and high cutting performance.

This object is solved by the present invention.

According to the invention, the feature known per se of a principal cutting edge which is continuously convexly curved over a radius starting from the cutting corner in the axial direction, is transferred for the first time to a drill made of a hard material. By overcoming the old prejudice that a hard and therefore brittle material cannot be ground in such a manner as to produce the principal cutting edge profile according to the invention, it is now possible to use the advantages arising from the geometry—avoidance of a sharp cutting corner, lengthening the principal cutting edge and reduction of the load per unit length of the principal cutting edge especially in the exterior zone.

Earlier attempts, as described hereinabove, have been directed towards countering the wear at the cutting corner by selecting a particularly hard material whereby however premature fracture can frequently occur with relatively low cutting performance or cutting values. The compromise of selecting a moderately hard and tough material using the casting chamfer geometry also did not yield satisfactory results with regard to long tool lives and high cutting values.

However, with a combination according to the invention of a hard material as drill material with the Racon point geometry which can reduce the rapid wear at the cutting corner accompanying the machining of cast material, it is possible to achieve long tool lives without needing to reduce the cutting value into uneconomical ranges. As a result of the advantages produced by the geometry, an unusually hard (and therefore unusually less tough) hard material can be used as the material for the drill for hard materials.

It is thus possible to provide suitable tools for the cutting of abrasive materials which nevertheless present high toughness requirements, such as grey iron and especially GGV or ADI which promise relatively low material costs in addition to long tool lives and cutting performance.

In this case, so-called cermets, cutting ceramics etc. especially hard metal, e.g. WC—TiC—Co based, are suitable as drill material or hard material.

With regard to the profile of the principal cutting edge, however, it is not only feasible to have a principal cutting edge running in one plane parallel to the drill axis over a radius but also other continuously convex curvatures such as, for example, a parabolic or hyperbolic curvature. In addition, within the scope of the invention the principal cutting edge can run not only in a flat plane parallel to the drill axis but also in a curved plane, for example a plane spanned by a drill axis parallel and an S—or sickle-shaped line perpendicular to the drill axis parallel as long as the curvature is continuously convex in the axial direction.

In this case, the drill according to the invention has cutting corners, i.e., the principal cutting edge is not completely tangentially adjacent to the drill circumference. The tip area which cannot be used for the bore length from the cutting corner as far as the drill tip or the chisel edge is thus shortened compared with a principal cutting edge which goes over completely tangentially so that the expenditure of material is reduced. On the other hand, despite the edge thus defined at the guide chamfer or the blunt cutting corner, the heat removal is sufficient to avoid thermal overstressing and to reduce the mechanical stressing compared with a principal cutting edge which runs free from curvature.

In tests, an axial distance of the chisel edge from the cutting corner of about half the drill nominal diameter (D) proved to be suitable, in particular 0.45×D.

In a further development according to the present invention, the principal cutting edge additionally has a central section wherein it runs linearly at a pre-determined acute angle, for example, 118° to 130°, to the chisel edge. The continuously convexly curved section is tangentially adjacent to the central section. This also helps to shorten the drill tip without reducing the positive effect of the curvature. In addition, a well-centring tip is thus created.

The non-tangential transition of the principal cutting edge to the auxiliary cutting edge has another advantage. This is because a clearly defined measuring point, not a transition, is formed at the cutting corner. The distance between the clamping of the tool and the external attachment of the principal cutting edge and thus the maximum useful boring depth can thus be easily measured. In this case, angles between the tangent to the principal cutting edge at the cutting corner and the drill axis between 10° and 40°, especially between 15° and 25°, have been found to be particularly advantageous since on the one hand the measuring point at the cutting corner can still be read off clearly at these angles but on the other hand, the cutting corner is sufficiently blunt to keep the thermal and mechanical loading low.

A measuring point which can be read off clearly at the cutting point is especially crucial for a step drill according to embodiments according to the present invention, since the useful drill hole depth of the first cutting stage (drill hole depth before the stage) can be measured in this way. The second cutting stage advantageously has the continuously convexly curved profile of the principal cutting edge in the axial direction in order to use the advantages of the geometry of the principal cutting edge according to the invention at the second cutting stage.

A web thinning is advantageously also provided with which the chisel edges is shortened so that the centring property is improved and the pressing of the chisel edge is reduced. With the point-thinned chisel edge it is also possible to use relatively large drill core diameters and thereby achieve an enhanced bending strength and torsional resistance of the tool. The large drill core in turn helps to satisfy the requirements for the toughness of the drill even when using a hard and therefore brittle material. Good results were especially achieved with a ratio of nominal diameter to drill core of 3.0 to 3.5. For example, a ratio of nominal diameter: drill core of around 3.2 has proved favourable for a drill having a nominal diameter of 12 mm.

With the afore-mentioned various advantageous further developments of the invention which relate to the geometry of the drill for hard materials, there is also scope for achieving material advantages so that an overall significant perceptible overall effect is achieved in relation to one or more of the partly contradictory goals of long tool lives, higher breaking strength, higher cutting performance and lower material costs.

For example, particularly wear-resistant hard-metal drills can be built, providing long tool lives with the same or even better cutting performance by using a hard and therefore unavoidably brittle material. As a result of the advantages achieved through the tip geometry, especially with regard to the lower loading on the cutting corner, despite the material used being less tough compared to the material used in a conventional drill, the same high cutting performance can be produced over the same tool life free from fractures. The higher hardness and therefore additionally increased wear resistance in turn result in the additional effect that higher feeds or cutting speeds can be driven without shortening the tool life. On the other hand, an additional considerable lengthening of the tool life can be achieved with the same cutting performance.

Such a drill optimized for machining abrasive materials such as GGV or ADI is the subject matter of embodiments of the present invention and consists of a hard metal of ISO-513 class K15 to K30 instead of the hard metal of ISO-513 class K30 to K40 commonly used for this purpose hitherto.

However, it is also possible to use the geometry advantages to reduce the material costs of the drill by using a coarser-grained and therefore cheaper material. Such a drill is the subject matter of embodiments of the present invention which consist of a fine-grained hard metal instead of the usual microgram.

In order to quantify the advantages which can be obtained, cutting tests were carried out on a workpiece made of GGV450 using various drills each having a nominal diameter of 10 mm and the same shape apart from the tip geometry:

A) Drill made of solid hard metal having a hardness of 1600 HV to 1700 HV and a bending strength of 3600 N/mm$^2$, standard tip geometry;

B) Drill made of solid hard metal having a hardness of 1600 HV to 1700 HV and a bending strength of 3600 N/mm$^2$, tip geometry according to the invention;

C) Drill made of solid hard metal having a hardness higher than 1800 HV and a bending strength less than 2500 N/mm$^2$, tip geometry according to the invention.

It was found that for the same tool life, 50% higher feeds could be used with drill B compared with drill A (drill A: cutting speeds 100 m/min, feed 0.4 mm/rev, drill B: cutting speeds 100 m/min, feed 0.6 mm/rev). In addition, a further increase in the tool life and/or the cutting values could be achieved with drill C consisting of a harder material, although the material has a substantially lower breaking strength.

The geometry according to the invention can be used with straight- or spiral-grooved drills. A substantially conical-surface-shaped grinding or grinding with divided free faces in the fashion of a four-face grinding is suitable as free-face grinding. Further geometric developments are in turn appropriate as a result of the properties of the selected drill material or allow a further optimization of the selected material:

Thus the drill advantageously has a cutting angle in the range of +/−5°. An increase in the stability of the cutting wedge can be achieved by the small cutting angle. When using coarser-grained material, breaking out of individual grains and therefore the blunting of the cutting edge can thus be prevented.

Especially in the case of spiral drills, the cutting angle of the principal cutting edge can be corrected to the desired dimension by a correction of the principal cutting edge or an additional correction grinding of the principal cutting edge so that the desired cutting wedge stability and wear resistance of the principal cutting edge is obtained. The drill is advantageously shaped so that the correction of the principal cutting edge can be ground in one operation with the web thinning of the chisel edge.

The proposed geometry of the drill tip is particularly suitable for double-edge drills. However, it would also be feasible to use it in three-knife trimmers or drills with a web divided by an additional cutting groove into a leading principal cutting web and a trailing reamer web.

Further developments relate to an internal cooling of the drill according to the invention which is preferably constructed as cooling channels running spirally or straight through the drill in the drill webs according to the embodiment. The cooling channels can have an elliptic or trigonal-shaped cross-sectional profile especially in drills having smaller nominal diameters. An internal cooling channel running through the drill on the drill axis and spreading in a Y-shape in the area of the drill tip would also be feasible.

The mouth openings preferably lie on the free faces of the webs. The mouth openings are advantageously expanded towards the back of the web and therefore the cutting groove by an additional undercut which decreases more steeply towards the back of the web than the free face in order to guide a higher throughput towards the cutting groove. With the drill configured in this fashion, it is possible to use minimum quantity lubrication (MMS) using an oil-air aerosol in addition to using a coolant emulsion to cool the drill especially at the principal cutting edge and cutting corner and to reduce friction resistance during cutting and swarf removal by lubrication.

In this case, the drill can constructed as a solid hard metal or a hard material drill. According to an advantageous further development according to the present invention, however, it is also possible to have a drill where only one cutting insert consists of the hard metal whereas the support for the cutting insert consists of a less hard but tougher material, for example, a tool steel. Thus, the individual parts, cutting insert and support, can be precisely adjusted to the respective type of loading.

In other embodiments, the cutting insert is a drill head soldered to the support (i.e., the drill shank) which consists of the hard material and on which the principal cutting edges, cutting corners and auxiliary cutting edges (section) are formed or ground in. Such embodiments are especially suitable for deep hole drills where the support extends over a large length and thus must have a high toughness to withstand the torsional loading.

In other embodiments, on the other hand, the cutting insert is a cutting plate which is screwed onto the drill in the circumferential direction. In this case, the entire drill with both principal cutting edges, cutting corners and auxiliary cutting edges (sections) can be constructed as a cutting plate which is inserted in a receiving groove provided for this purpose on the face of the support and is screwed or soldered there.

However, it is also feasible to use exchangeable cutting plates which each form only one principal cutting edge or a principal cutting edge section and are screwed to corresponding plate seats, especially to the step in a step tool. A corresponding support cassette equipped with cutting plates could also be provided there. In this way, the cutting geometry-hard material combination according to the invention can be used not only with exchangeable cutting plates and a standard tool carrier but the production technology can also be made considerably easier: the cutting geometry need not be ground directly on the drill in the hard material but can be ground, at least in sections, on easily accessible hard-material cutting plates.

A coating of the drill can be provided at least in the area of the sharp cutting edges in the sense of a further increase in the tool lives and cutting performance. All common coatings which can achieve a reduction in friction and/or a reduction in wear can be used. Especially preferred is a layer of hard material, e.g. diamond, preferably nanocrystalline diamond, TiN, TiAlN or TiCN, or a multilayer coating. A lubricating layer, for example of MoS2 known under the name "MOLYGLIDE" would also be feasible.

Some advantageous embodiments of the inventions are explained hereinafter with reference to the figures:

Figure 1:
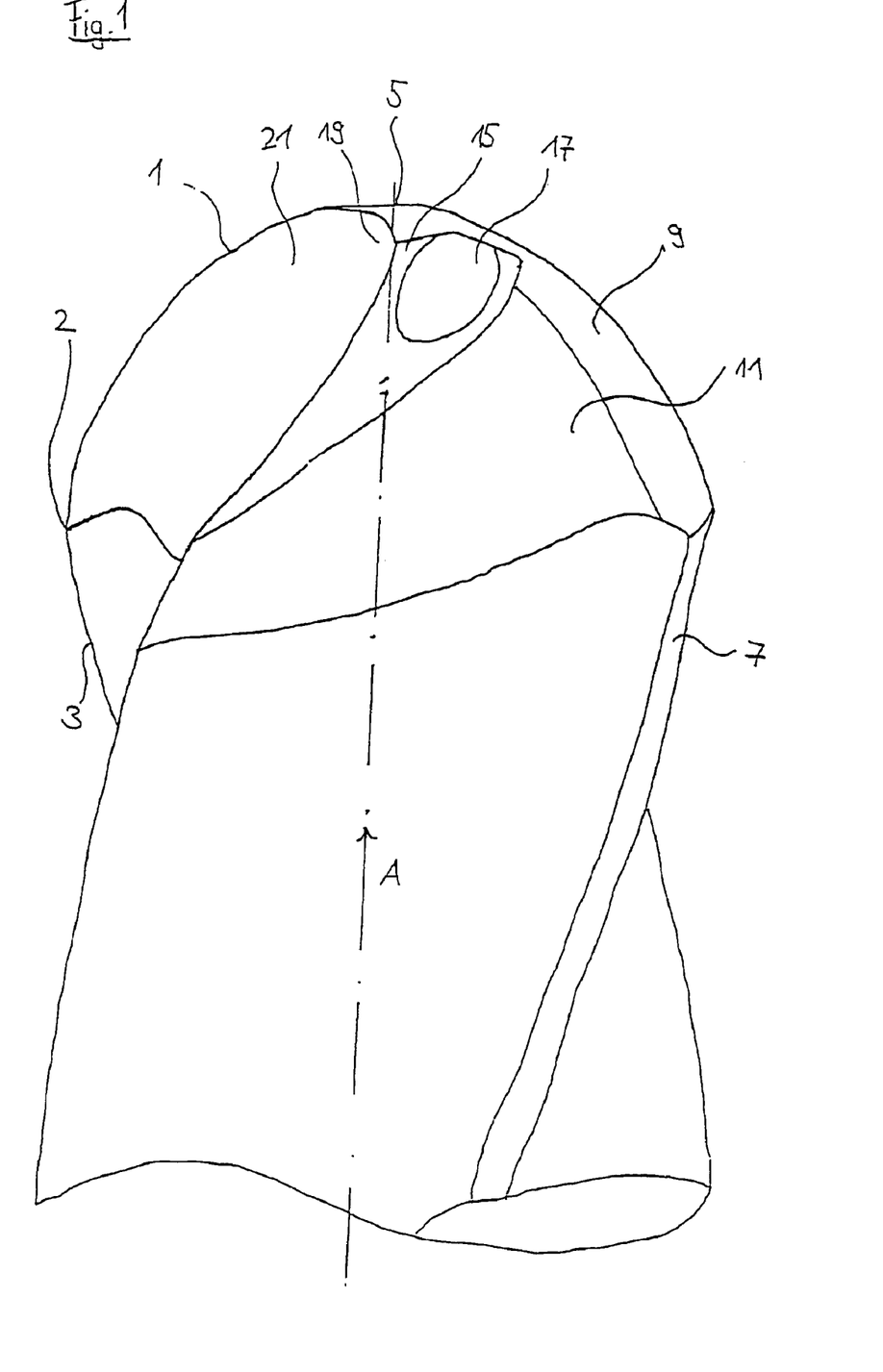
FIG. 1 is schematic side view of a spirally grooved solid hard metal drill according to one embodiment of the invention.

Reference is first made to FIG. 1. This shows a double-edge spiral drill made of a hard metal of application group K20 (ISO 513). Here 1 denotes the principal cutting edge of the drill, 5 is the chisel edge, 2 is the cutting corner and 3 is the auxiliary cutting edge. As can be seen, the principal cutting edge 1 runs continuously convexly curved in the radial direction and goes over gently into the auxiliary cutting edge at a small tangent angle so that the cutting corner 2 is strongly blunted. On the other hand, the transition at the cutting corner 2 is sufficiently defined to use the cutting corner as a measuring point for a length measurement of the drilling tool. There is thus a clearly defined edge between a first free face 9 and a guide chamfer 7. The transition from principal cutting edge 1 to chisel edge 5 on the other hand is almost tangential.

The first free face 9 is ground in a conical-surface shape and undercut with a second, likewise conical-surface-shaped free face. At the same time, the mouth opening 17 of an internal cooling channel can be identified which emerges approximately at the point where the ridge of the two free faces 9, 11 would be. However, the drill has a face 15 there, formed by an undercut which decreases steeply towards the back of the web or the cutting groove.

The profile of the principal cutting edge 1 is determined by a correction grinding whereby a principal-cutting-edge correction face 21 on the one hand and a chisel-edge web thinning 19 on the other hand is applied. The principal-cutting-edge correction face 21 runs in the axial direction, i.e. parallel to the drill axis A so that the principal cutting edge runs in a flat plane spanned by the cutting corner 2 and by a parallel to the drill axis at the plotted point of the chisel edge 5.

Figure 2:
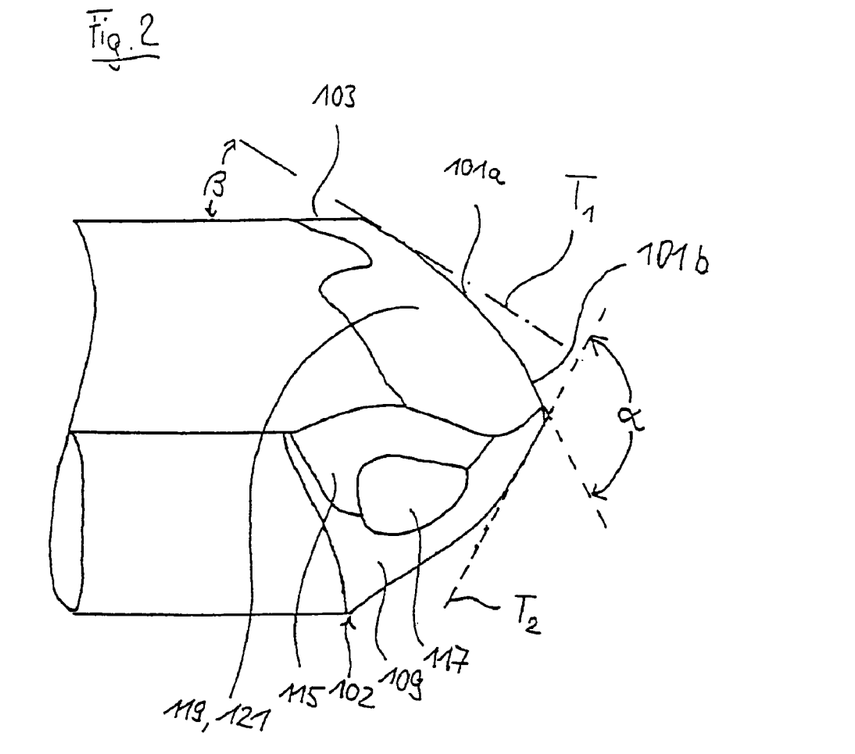
FIG. 2 is schematic side view of a straight-grooved solid hard metal drill according to a further embodiment of the invention.
Figure 3:
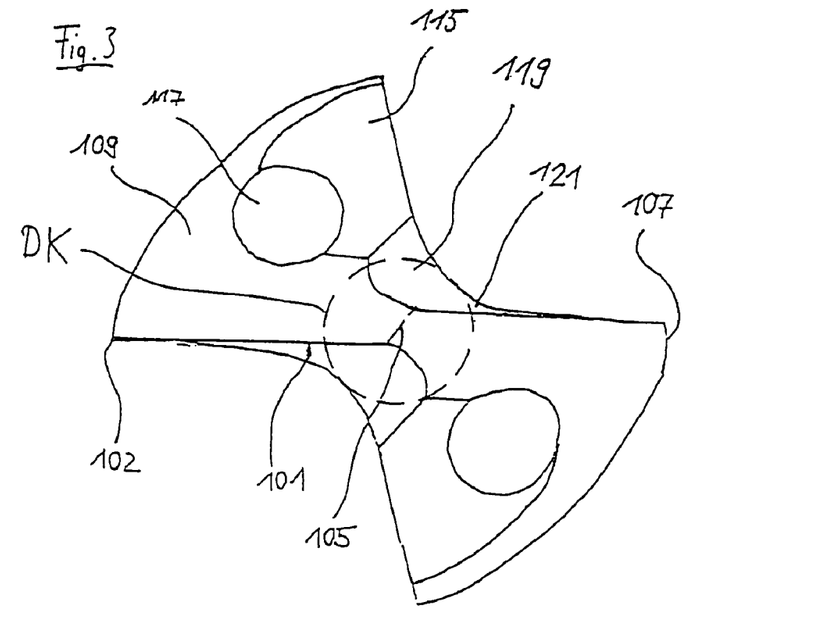
FIG. 3 is a front view of the drill shown in FIG. 2.

FIGS. 2 and 3 show a straight-grooved drill made of hard metal of application group K20 (ISO 513) according to a further embodiment of the invention. The same or similar features are denoted by similar reference numbers as in the drill in FIG. 1. So, 101 denotes the principal cutting edge, 105 is the chisel edge and 102 is the cutting corner. In this case, the principal cutting edge 101 is divided into two sections 101a, 101b:

In the outer section 101a adjacent to the auxiliary cutting edge, the principal cutting edge has a continuously convex curvature in the plane spanned by the cutting corner and the drill-axis parallel at the plotted point of the chisel edge 105 whereas in the central section 101b, it runs rectilinearly at the acute angle α in the plane spanned by the cutting corner 102 and the drill-axis parallel at the plotted point of the chisel edge 105. In this case, the section 101a goes over tangentially into the section 101b; $T_2$ is the tangent of the section 101a at the transition into the second section 101b which is at the same time a side of the acute angle α.

At the outer end of the section 101a the principal cutting edge ends with the angle β (measured in the plane spanned by the cutting corner 102 and the drill-axis parallel through the plotted point of the chisel edge 105) between the tangent $T_1$ to the curved principal cutting edge section 101a and auxiliary cutting edge 103, so that a blunt but nevertheless clearly recognisable cutting corner 102 is formed.

Both conical-surface-shaped ground free faces 109 additionally have an undercut face 115 wherein a mouth or outlet opening of the Y-shaped internal cooling channel is located in each case at the ridge formed by the free face 109 and the undercut face 115. The outlet opening 117 is widened towards the back of the web or towards the cutting groove by the undercut face 115 so that an increased coolant throughput and an intensified removal of coolant into the cutting groove is brought about.

A web thinning 119 can be seen particularly clearly in FIG. 3 which is incorporated in a grinding process with a principal cutting edge correction 121 which can again be seen particularly clearly in FIG. 2. The principal cutting edge correction 121 gives the principal cutting edge 101 its rectilinear profile when viewed from above and blunts the cutting angle on the principal cutting edge 101 to about 90° so that a particularly wear-resistant cutting edge is formed. The web thinning 119 results in a short length of the chisel edge 105 despite the large core diameter DK so that on the one hand, in cooperation with the central section 101b of the principal cutting edge 101 a good centring tip is formed and excessive friction values can be avoided as a result of the pressing chisel edge 105 and on the other hand, a very high stability of the drill is ensured as a result of the large drill core. In the embodiment shown, the ratio of drill nominal diameter to drill core is about 3.5.

Overall, both as a result of the combination of features of the spiral embodiments shown in FIG. 1 and the combination of features of the straight-grooved embodiment of the invention shown in FIGS. 2 and 3, it is possible to produce a drill which is optimized for the cutting of abrasive materials posing high toughness and bending strength requirements such as, for example, grey iron and in particular GGV or ADI.

The cutting corner 2; 102 is merely exposed to a tolerable thermal and mechanical loading as a result of the small angle α at the transition of the principal and auxiliary cutting edge;

The hard metal drill material K20 gives the drill a high hardness;

The relatively large core diameter DK gives the drill a relatively high torsional loading capacity;

The convex curvature of the principal cutting edge 101 reduces the loading per unit length of the principal cutting edge especially in the outer section;

The cutting edge becomes blunter and thus more resistant to corrosion as a result of the principal cutting edge correction;

At the same time the web thinning 19; 119 brings about a shortening of the chisel edge and thus ensures a good centring effect and avoids any too-strong pressing of the chisel edge;

Coolant emerging from the mouth openings 17; 117 and passed via the undercut faces 15; 115 into the cutting groove, for example, an MMS aerosol reduces the abrasive friction and cools the cutting edge and the cutting corner.

Furthermore, a precise measurement of the drill length from the cutting corner 2; 102 can be made since the angle α is still large enough to read off the measuring point without any problem.

Figure 4:
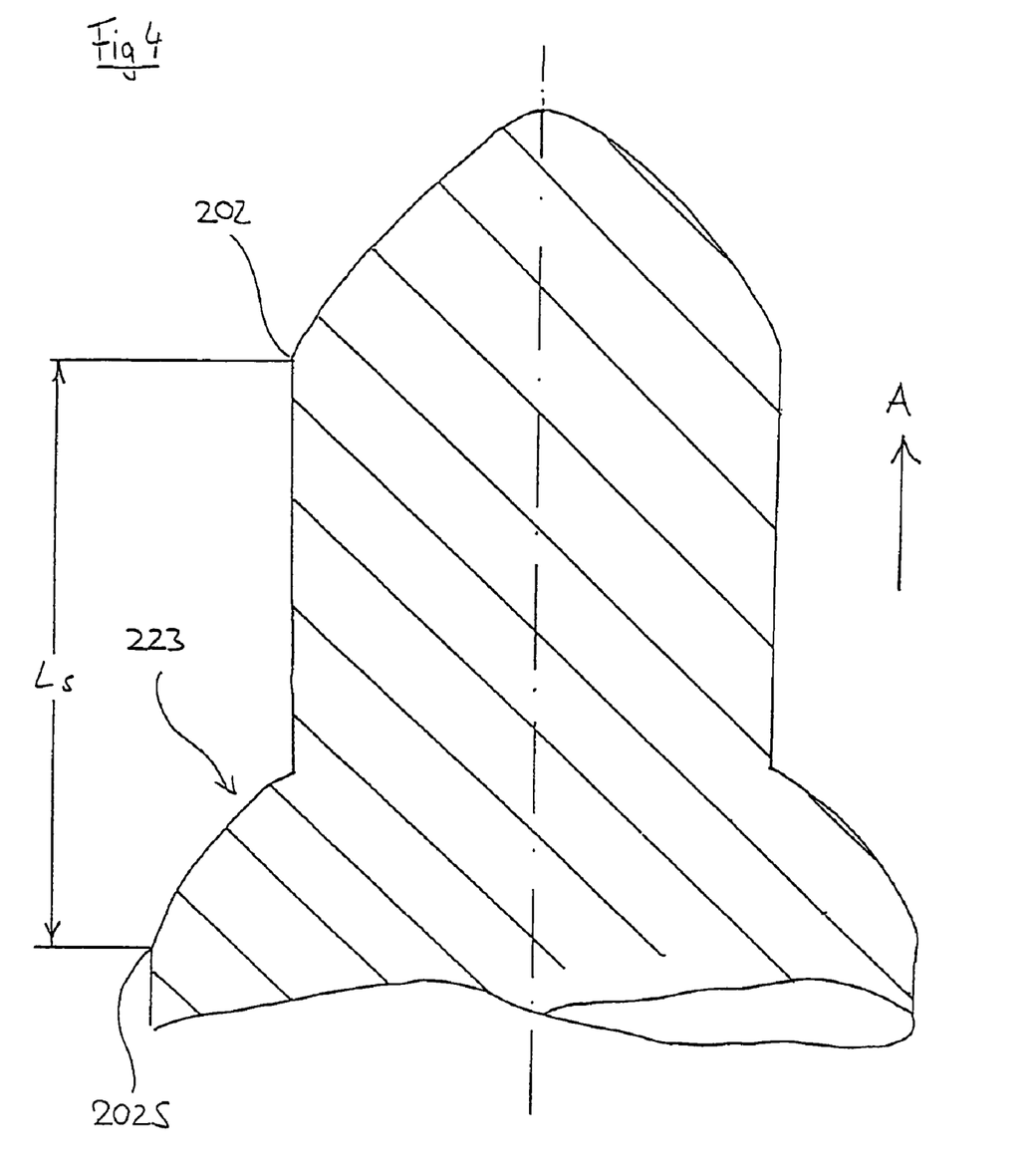
FIG. 4 is a schematic sectional view of a step drill according to a further embodiment of the invention.

This is particularly important in step tools as can be seen from FIG. 4. In this case, the length $L_S$ of the pre-drilling step measured from cutting corner 202 (pre-drilling step) to cutting corner 202S (second drilling step 223) is crucial. The precise geometry of the step drill is only shown schematically in FIG. 4 since at the pre-drilling step it largely corresponds to the geometry shown in FIG. 1 and at the second drilling step 223 a continuously convexly curved principal cutting edge profile is provided.

Figure 5:
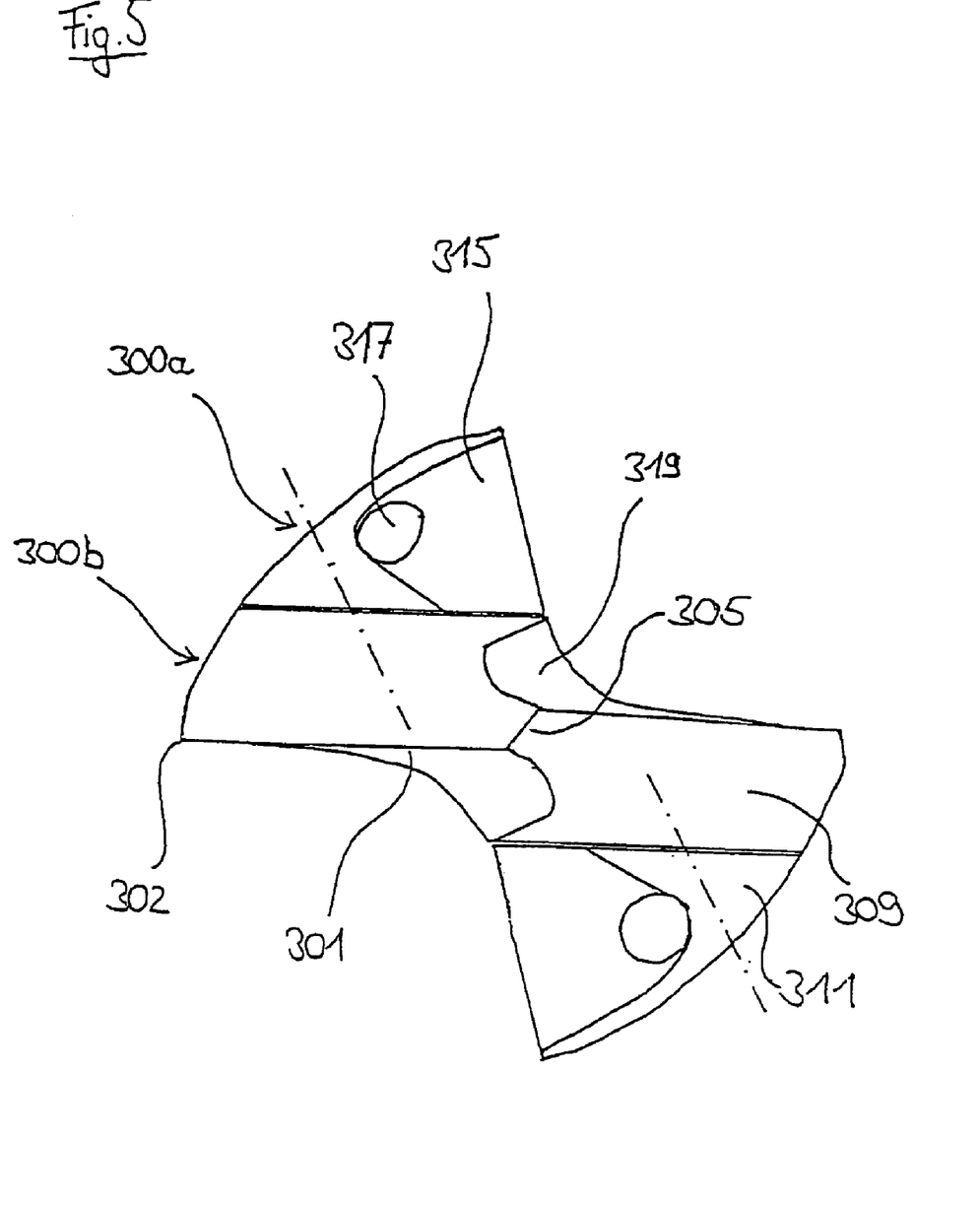
FIG. 5 is a front view according to FIG. 3 of a straight-grooved drill with a cutting insert according to a further embodiment of the invention.

Finally, FIG. 5 shows an embodiment of the drill according to the invention where a support 300a is fitted with a cutting insert 300b. The cutting insert 300b fits in a transverse groove running centrally through the front face of the support 300a and is screwed to the support 300a by screws indicated by dot-dash lines. For this, reference is made to our own application PCT/EP93/03118. The insert 300a consists of a hard metal of application class K20 (ISO 513) whereas the support consists of high-speed steel (HSS). Whereas the internal cooling with the outlet openings 317 is completely accommodated in the support 300a, which forms a second free face 311 and an undercut face 315 at the front, the chisel edge 305, two principal cutting edges 301 and cutting corners 302 are accommodated on the cutting insert 300b, likewise the web thinning 319 of the chisel edge to shorten the chisel edge 305. An additional correction grinding of the principal cutting edge can be dispensed with here since the cutting insert 300b can be produced in accordance with the desired principal cutting edge geometry. In this case, the principal cutting edge 301 has the profile shown in FIG. 2 in the plane spanned by the cutting corner and the drill axis parallel through the plotted point of the chisel edge 305.

Deviations from the embodiments shown are naturally possible without departing from the scope of the invention.

Thus, cutting breaker grooves could be ground in on the principal cutting edge—in the cutting groove and/or the free face to further optimize the drill according to the invention.

Furthermore, by suitably shaping the cutting grooves or cutting edge correction grinding, it would also be possible to have an S—or sickle-shaped profile of the principal cutting edges when the drill is seen in plan view whilst retaining the continuously convexly curved profile in the axial direction in order to further enlarge the length of the principal cutting edge in this way and achieve a positive cutting angle at the cutting corner with respect to the auxiliary cutting edge, i.e. a blunt cutting edge.

It is also possible to shift the length of the exterior zone wherein the principal cutting edge is continuously convexly curved and the central area wherein the principal cutting edge runs rectilinearly, arbitrarily with respect to one another.

The invention is thus embodied in each individual one of the following optional features and in any combination of features which seems logical:

The drill is made of hard material;

The drill has webs that are subdivided by means of cutting grooves and at least two principal cutting edges (1; 101; 301), each of which is provided with a cutting corner (2; 102; 302) and a transition to a chisel edge (5; 105; 305);

At least some sections (101a) of the principal cutting edge (1; 101; 301) are continuously convex in an axial direction (A) starting from the cutting corner (2; 102; 302);

A tangent ($T_1$) to the principal cutting edge (101) at the cutting corner (102) encloses an angle ($\beta$) of 10° to 40° with an auxiliary cutting edge (103);

The continuously convexly curved section (101a) of the principal cutting edge (101) borders substantially tangentially ($T_2$) on a central section (101b) wherein the principal cutting edge (101) runs linearly at an acute angle ($\alpha$) to the chisel edge (105);

An axial spacing of the chisel edge (5; 105; 305) from the cutting corner (2; 102; 302) approximately corresponds to 0.5×D, in particular 0.45×D, where D is the nominal diameter of the drill;

The hard material of which the drill consists at least in the area (300b) near the cutting corner is a hard metal, especially of the class K15-K30;

The hard material of which the drill consists at least in the area (300b) near the cutting corner is a fine-grained hard metal;

The hard material of which the drill consists at least in the area (300b) near the cutting corner has a hardness higher than 1800 HV and a bending strength below 3000 N/mm$^2$, especially below 2500 N/mm$^2$;

The drill has a web thinning (19; 119; 319) which shortens the chisel edge (5; 105; 305);

The drill has a ratio of nominal diameter:drill core of 3.0 to 3.5, in particular 3.2;

The drill for hard materials is straight grooved;

The drill for hard materials is spiral grooved;

The drill for hard materials has an internal cooling (17; 117; 317) wherein internal cooling channels run through the webs to mouth openings (17; 117; 317) in the zone near the cutting edge, preferably on the free faces (9, 11; 109; 311) of the drill;

At the mouth openings (17; 117; 317) at the free faces (9, 11; 109; 311), there is provided an additional undercut (15; 115; 315) which decreases more steeply towards the back of the web than the free faces (9, 11; 109; 309, 311);

The drill for hard materials has a cutting angle in a range of +/−5°.

The drill for hard materials has a correction grinding (21; 121) of the principal cutting edge;

The correction grinding (21; 121) of the principal cutting edge and the web thinning (19; 119) merge into one another without any transition so that they can be ground in one operation;

The drill for hard materials has a substantially conical-surface-shaped tip grinding;

The drill for hard materials has a tip grinding corresponding to a substantially four-face grinding;

The drill for hard materials has at least one further cutting stage (223);

The principal cutting edge also has a cutting corner (202S) at the second cutting stage (223) and starting from the cutting corner (203S) at least some sections are continuously convexly curved in the axial direction (A);

At least one cutting insert (300b) connected to a support (300a) is provided wherein at least the cutting insert (300b) consists of the hard material;

The cutting insert is constructed as a drill head soldered to a support on which the principal cutting edges are provided, wherein at least the drill head is made of the hard material;

The at least one cutting insert (300b) is constructed as a cutting plate (300a) on which the principal cutting edges (301) are provided or a cutting plate providing at least the outer section of the principal cutting edge is provided per principal cutting edge which is or are screwed to the support (300a) in the circumferential direction, wherein at least the cutting plate (300a) or the cutting plates consist of the hard material.

The invention claimed is:

1. A drill for hard materials comprising:
    webs that are subdivided by means of cutting grooves;
    at least a first principal cutting edge, each said principal cutting edge being provided with a cutting corner and a transition to a chisel edge, said first principal cutting edge being convex from said cutting corner to said chisel edge; and
    at least two free faces associated with each principal cutting edge.

2. The drill for hard materials according to claim 1, wherein a tangent to the principal cutting edge at a corresponding cutting corner encloses an angle of from about 10° to about 40° with an auxiliary cutting edge.

3. A drill for hard materials comprising:
    webs that are subdivided by means of cutting grooves;
    at least one principal cutting edge, each said principal cutting edge being provided with a cutting corner and a transition to a chisel edge, at least some sections of each principal cutting edge being continuously convex in an axial direction starting with each said cutting corner, said continuously convex section of the principal cutting edge bordering substantially tangentially on a central section, the principal cutting edge running linearly at an acute angle to the chisel edge; and
    a correction grinding of the principal cutting edge merging into a web thinning without any transition so that they can be ground in one operation.

4. The drill for hard materials according to claim 1, wherein an axial spacing of the chisel edge from the cutting corner approximately corresponds to 0.5×D, where D is the nominal diameter of the drill.

5. The drill for hard materials according to claim 1, wherein at least an area near the cutting corner is a hard metal.

6. The drill for hard materials according to claim 1, wherein at least an area near the cutting corner is a fine-grained hard metal.

7. The drill for hard materials according to claim 1, wherein at least an area near the cutting corner has a hardness higher than 1800 HV and a bending strength below 3000 N/mm$^2$.

8. The drill for hard materials according to claim 1, wherein said drill comprises a web thinning which shortens the chisel edge.

9. The drill for hard materials according to claim 1, wherein a ratio of nominal diameter: drill core is in the range of from about 3.0 to about 3.5.

10. The drill for hard materials according to claim 1, wherein said drill is straight grooved.

11. The drill for hard materials according to claim 1, wherein said drill is spiral grooved.

12. The drill for hard materials according to claim 1, further comprising an internal cooling wherein internal cooling channels run through the webs to mouth openings in a zone near the cutting edge.

13. The drill for hard materials according to claim 12, wherein the mouth openings are on said free faces of the drill, there is provided an additional undercut on at least one of the mouth openings, and the undercut decreases more steeply towards the back of the web than the free faces.

14. The drill for hard materials according to claim 1, wherein said drill has a cutting angle in a range of +/−5°.

15. The drill for hard materials according to claim 1, wherein said drill comprises a correction grinding of the principal cutting edge.

16. The drill for hard materials according to claim 15, wherein the correction grinding of the principal cutting edge and the web thinning merge into one another without any transition so that they can be ground in one operation.

17. The drill for hard materials according to claim 1, wherein said drill comprises a substantially conical-surface-shaped tip grinding.

18. The drill for hard materials according to claim 1, wherein said drill comprises a tip grinding corresponding to a substantially four-face grinding.

19. The drill for hard materials according to claim 1, further comprising at least one further cutting stage.

20. The drill for hard materials according to claim 19, wherein the principal cutting edge also has a cutting corner at the second cutting stage and starting from the cutting corner at least some sections are continuously convexly curved in the axial direction.

21. The drill for hard materials according to claim 1, wherein at least one cutting insert connected to a support is provided, wherein at least the cutting insert consists of a hard material.

22. The drill for hard materials according to claim 21, wherein the cutting insert is constructed as a drill head soldered to a support on which the at least one principal cutting edge is provided, wherein at least the drill head is made of a hard material.

23. The drill for hard materials according to claim 21, wherein at least one cutting insert is constructed as a cutting plate on which the principal cutting edges are provided or a cutting plate providing at least the outer section of the principal cutting edge is provided per principal cutting edge which is or are screwed to the support in the circumferential direction, wherein at least the cutting plate or the cutting plates consist of a hard material.

24. The drill for hard materials according to claim 1, wherein at least one of said free faces is continuously convex in an axial direction.

25. A drill for hard materials comprising:

webs that are subdivided by means of cutting grooves;

at least one principal cutting edge, each said principal cutting edge being provided with a cutting corner and a transition to a chisel edge, at least some sections of each principal cutting edge being continuously convex in an axial direction starting with each said cutting corner; and a correction grinding of the principal cutting edge merging into a web thinning without any transition so that they can be ground in one operation.

* * * * *